INVENTOR
James J. Strnad
By Corbett, Mahoney, Miller & Rambo
BY *W. A. Rambo*
ATTORNEYS United States Patent Office 2,961,806
Patented Nov. 29, 1960

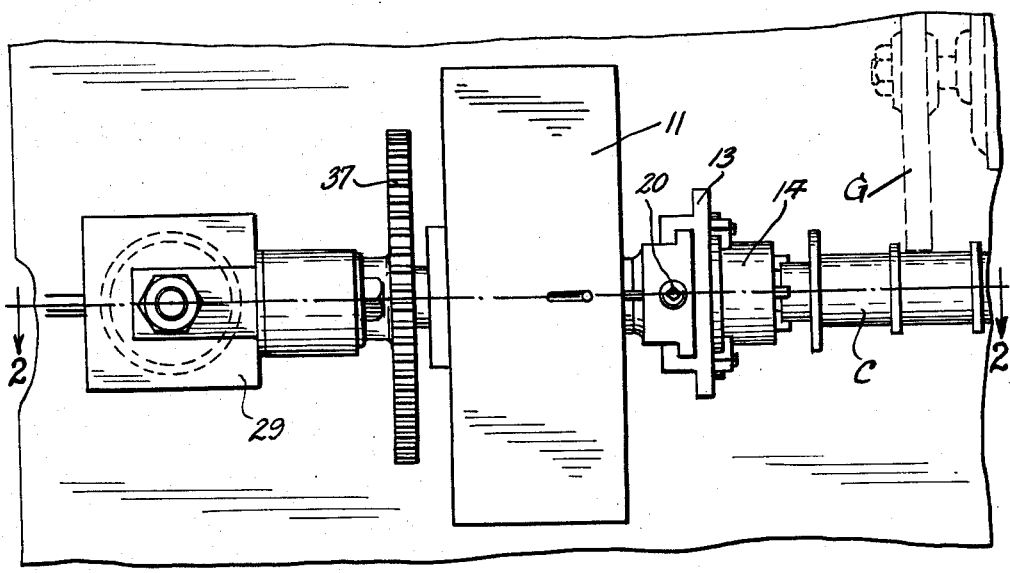
FIG. 3.
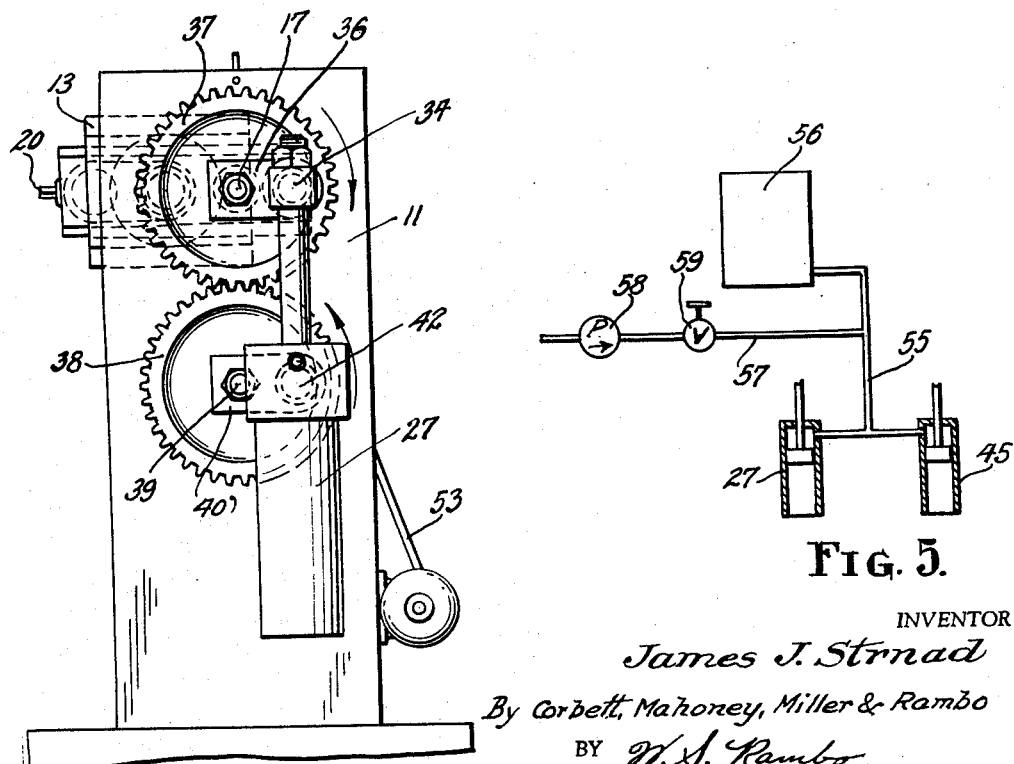
FIG. 4.
FIG. 5.
INVENTOR
James J. Strnad
By Corbett, Mahoney, Miller & Rambo
BY W. S. Rambo
ATTORNEYS Nov. 29, 1960     J. J. STRNAD     2,961,806
PNEUMATIC COUNTERBALANCING SYSTEM FOR UNBALANCED ROTATING BODIES
Filed March 6, 1958     4 Sheets-Sheet 4

2,961,806

PNEUMATIC COUNTERBALANCING SYSTEM FOR UNBALANCED ROTATING BODIES

James J. Strnad, Bedford, Ohio, assignor to Lempco Products, Inc., Bedford, Ohio, a corporation of Ohio Filed Mar. 6, 1958, Ser. No. 719,557

12 Claims. (Cl. 51—105)

This invention relates to a pneumatic counterbalancing system for unbalanced rotating bodies. It has to do, more particularly, with a pnuematic counterbalancing system which is particularly useful in machine tools wherein the work which is rotated is out of balance due to the fact that it is rotated about an axis not corresponding to its center of gravity. The invention will be described specifically with relation to a machine for grinding crankshafts but it is to be understood that it is not limited thereto.

This system is an improvement over the pneumatic balancing apparatus disclosed in the copending application of Thomas R. Wilson, Serial No. 631,662, filed December 31, 1956, now abandoned.

In machines for grinding engine crankshafts, during the grinding of each crank rod journal, the crankshaft is rotated on an axis corresponding to that of the rod journal. This axis is offset laterally from the main bearing axis and, therefore, from the center of gravity of the crankshaft. Therefore, during this grinding operation, the crankshaft is out of balance.

Crankshaft grinding machines generally have crankshaft holders or chucks mounted on machine shafts or spindles for gripping opposite ends of the crankshaft and one or both the spindles are power driven. The grinding operation is performed around an axis coinciding with the spindle axis. The chucks are parts of so-called adjustable throwheads by means of which the crankshaft gripped thereby can be shifted radially of the spindle axis to position the main bearings at such axis for grinding or to position each of the rod journals at such axis for grinding. In the latter case, the chuck-supported crankshaft is out of balance during rotation and it is desirable to provide some counterbalance means.

Attempts have been made in the past to mechanically counterbalance the unbalanced weight by providing adjustable weights on the throwheads opposite the imbalance in the shaft and these attempts have met with some degree of success. However, a better means for providing the counterbalance was found to be the pneumatic counterbalance means disclosed in said copending application, especially because of the ease in which the counterbalance force could be adjusted, that is, by the mere adjustment of a control valve. The pneumatic means of said copending application has been found to be very desirable in actual operation but due to the design and manner of application to the machine of the penumatic counterbalance unit thereof, it is difficult to provide a single machine which could tolerate work having widely varying unbalanced weights due to the sizes of the crankshaft, for example, work ranging from the crankshaft of an outboard motor to that of a heavy tractor or truck.

It is the main object of this invention to provide a pneumatic counterbalancing system for machines of the type indicated in which the pneumatic counterbalance unit thereof will accurately counterbalance the work piece and which is so designed and so applied to the machine that a single machine will tolerate a variety of work pieces having a wide range of imbalances due to a difference in size or to other characteristics thereof.

According to said copending application, a pneumatic balancing apparatus is provided in association with a crankshaft grinding machine in which an attempt is made to counterbalance substantially the imbalances in the shaft and associated parts of the machine by a pressure-responsive unit in the form of a cylinder and piston unit permanently mounted on the machine, the unit being controlled by a valve to selectively adjust its counterbalance force. The piston and cylinder unit is supported on the machine and is so connected to the crankshaft that rotation of the shaft relatively reciprocates the piston and cylinder and creates varying counterbalance effects which aid in counterbalancing the unbalanced weight of the shaft during its rotation about a horizontal axis. Associated with the pressure-responsive unit is a volume tank or accumulator which serves to reduce the varying pressure effects of reciprocation of the piston against the air in the cylinder upon rotation of the shaft. According to said copending application, the pneumatic unit is anchored at a horizontal pivot point in a fixed location on a support of the machine and is pivotally connected to the horizontally disposed shaft at the outer end of a bellcrank lever carried thereby. The location of the pivot to the bellcrank lever is predetermined insofar as practical to offset the imbalance in the shaft. Due to this relative pivot arrangement, during rotation of the shaft, the cylinder and piston unit rocks about the horizontal support pivot so that the counterbalance force vector created by the unit swings to different angles relative to the vertical with the result that there is a variation, depending upon the position of the unit, in the counterbalance forces created by the relative reciprocation of the piston and the cylinder and in their application to the bellcrank lever. Because of the swinging of the force vector, which corresponds to the axis of the piston, the torque arm or moment arm upon which the force vector acts, in the counterbalancing operation, varies differently than the moment arm upon which the unbalanced weight or gravity acts. In other words, during rotation of the crankshaft, the moment arm of the penumatic counterbalance is not maintained in direct proportion to the moment arm of the unbalanced weight and, therefore, exact balance will not result. With this arrangement, pneumatic balance depends upon an angular displacement of the work spindle, to cause a varying counterbalance effect and theoretically exact balance cannot be obtained for any crankshaft. Values such as the bellcrank lever arm and the location of the support pivot for the cylinder and piston unit relative to the bellcrank pivot must be selected with regards to a certain group of crankshafts since the out of balance condition at any angle in rotation of the crankshaft is directly proportional to the weight and throw of the crankshaft.

According to this invention, however, the pneumatic cylinder and piston unit are mounted on the machine in a more effective manner so as to obtain theoretically exact counterbalance of the crankshaft. The theoretical pressure necessary in the pressure-responsive unit to balance the crankshaft is independent of the angular displacement of the work spindle and is directly proportional to the weight and throw of the crankshaft and can, therefore, theoretically exactly balance any crankshaft assuming the pressure on the piston is substantially constant. This pressure is maintained substantially constant by having an accumulator in the pneumatic system which is connected to the cylinder and will prevent appreciable variations in air pressure therein upon relative displacement of the piston and cylinder. According to this invention, the pressure in the pneumatic unit necessary to balance the shaft at any angle during its rotation is dependent only upon three constants, namely, the weight of the shaft, the throw of the shaft and the bellcrank lever distance. Assuming the accumulator is large enough to compensate for piston and cylinder relative displacement, thereby providing a constant penumatic pressure, the system is in theoretically perfect balance at any angle of displacement of the spindle axis.

The objects and advantages of this invention are accomplished by pivotally connecting one end of a cylinder and piston unit to a member, which may be termed the first bell-crank member, rotatable with a crankshaft-supporting spindle about a horizontal axis, at a predetermined distance radially thereof, and by pivotally connecting the other end of the unit to a second member, which may be termed the second bellcrank member, which is driven in unison with the first bellcrank member about an axis parallel to the axis of rotation of said first member. The result of this arrangement is that the axis of the cylinder and piston unit remains in a constant angular position and, consequently, the force vector resulting from the constant pneumatic pressure on the piston is always constant, so that the resulting torque or counterbalance force theoretically exactly counterbalances the crankshaft regardless of the angular position of rotation of the crankshaft. This is due to the fact that regardless of the throw of the crankshaft and the length of the opposing bellcrank lever, the effective moment arms of the unbalanced weight and the counterbalancing force are maintained in direct proportion at all times during rotation of the crankshaft. Consequently, the machine will be capable of tolerating work with a widely varying range of imbalances.

In the accompanying drawings, the preferred embodiment of this invention is disclosed but it is to be understood that details thereof may be varied without departing from basic principles of the invention.

In these drawings:

Figure 3 is a plan view of the end portion of the machine shown in Figure 2.

Figure 4 is an end elevational view of the machine.

Figure 5 is a diagram of the pneumatic counterbalance system of the machine.

Figures 6 to 9, inclusive, are diagrams illustrating the effect of the counterbalance system in successive positions of rotation of a crankshaft being rotated in an unbalanced position on the machine.

Figure 1:
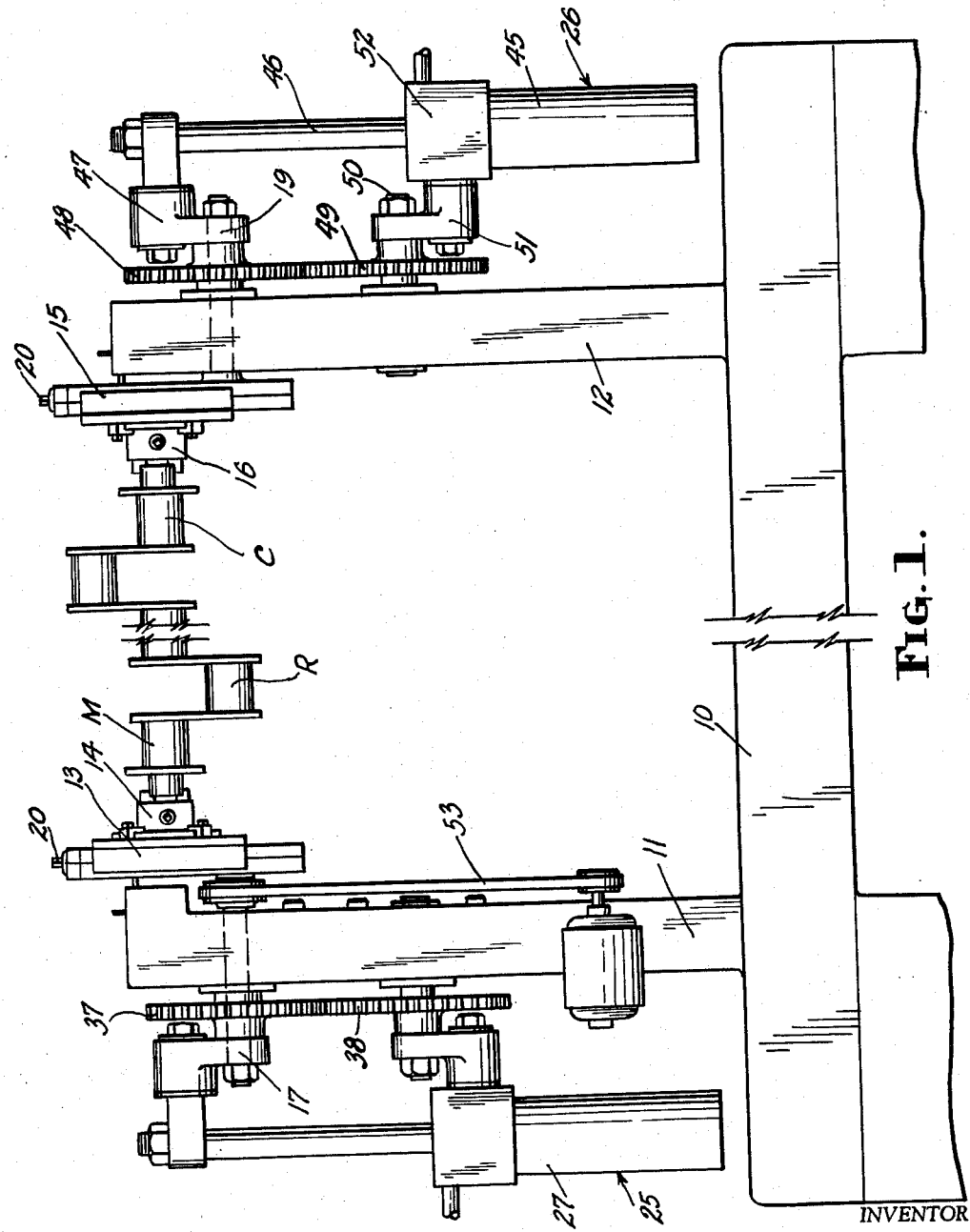
Figure 1 is a side elevational view of a crankshaft grinding machine in which the pneumatic counterbalancing system of this invention is incorporated.

With reference to the drawings and particularly to Figure 1, this invention is shown as being embodied in a crankshaft grinding machine comprising a base 10 which has a headstock 11 at one end thereof and a tailstock 12 at the other end thereof. The headstock 11 carries the usual adjustable throwhead 13 that supports a chuck 14. Similarly, the tailstock 12 carries at its upper end the usual adjustable throwhead 15 which supports a chuck 16. The chucks 14 and 16 are adapted to grip the opposed ends of the crankshaft C to be ground. It will be apparent that the throwheads 13 and 15 are adjustable to position the chucks 14 and 16 at various positions along the respective throwheads. Thus, in Figure 2 the throwhead 13 is shown as being provided with the adjusting screw 20 for adjusting the chuck 14 therealong, and the other throwhead 15 is of identical structure being also provided with an adjusting screw 20. The throwhead 13 is mounted for swinging movement about the axis of a spindle shaft 17 which is rotatably carried in a bearing structure 18 at the upper end of the headstock 11. Similarly, the throwhead 15 is mounted for swinging movement on the upper end of the tailstock 12 about the axis of the shaft 19 which is rotatably mounted in a similar bearing structure.

It will be apparent that by adjustment of the screws 20 of the throwheads 13 and 15, the chucks 14 and 16, respectively, may be moved radially relative to the axis of rotation of the spindle shafts 17 and 19. Consequently, the crankshaft may be centered relative to this spindle axis for grinding of the main bearings M or may be offset laterally to center the rod bearings R relative to the spindle axis. A grinding unit which may be associated with the shaft C is indicated diagrammatically in Figure 3 and is designated G.

The pneumatic counterbalance system of this invention is associated with the work-supporting spindles 17 and 19. It includes a pneumatic balancing unit in the form of a cylinder and piston unit 25 associated with the headstock 11 and a cylinder and piston unit 26 associated with the tailstock 12. Since both of these units are identical, one only will be described and this description will relate to the unit 25 which is shown in detail in Figure 2.

Figure 2:
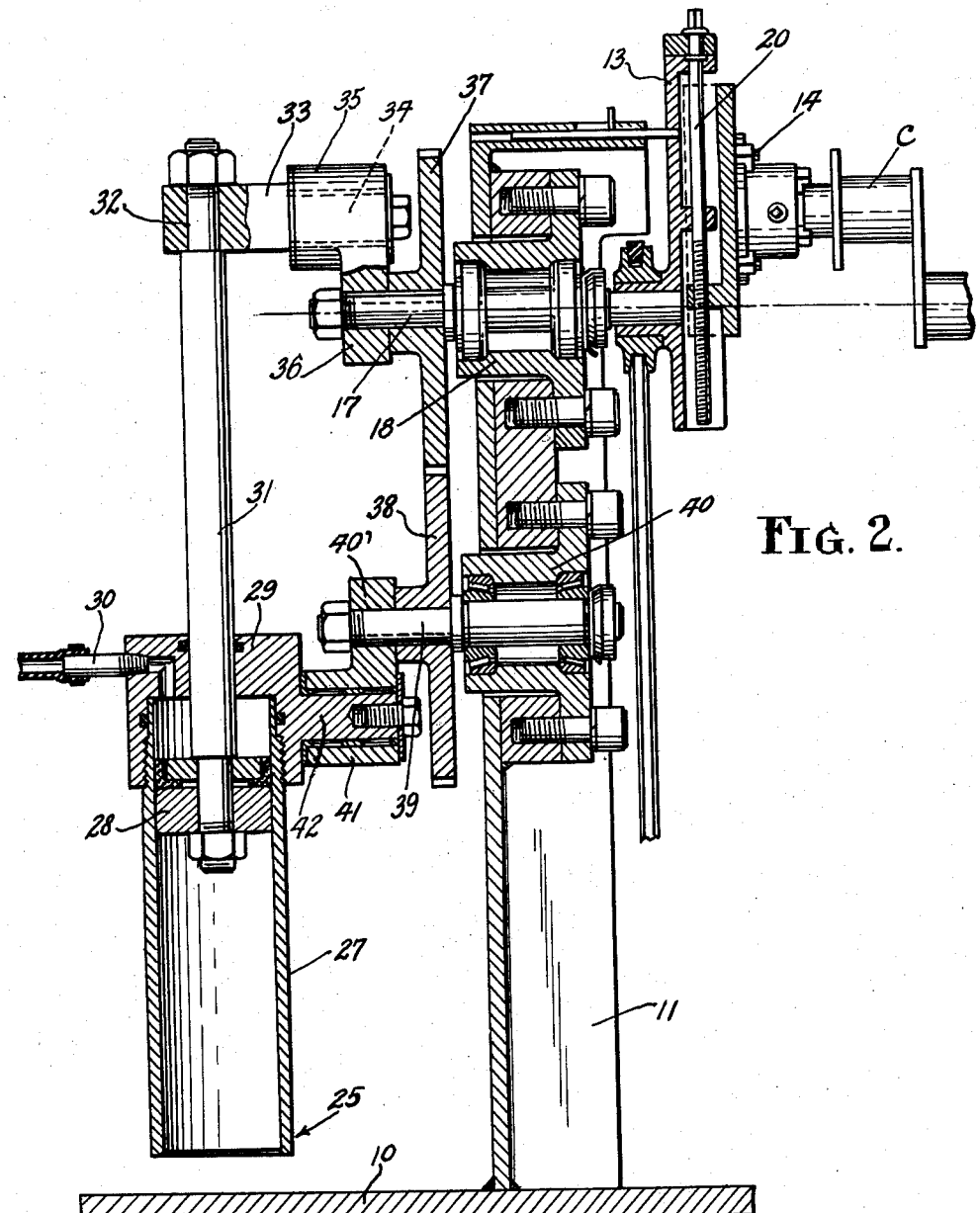
Figure 2 is a vertical longitudinal sectional view through one end portion of the machine and taken along line 2—2 of Figure 3.

The unit 25, as shown best in Figure 2, comprises relatively movable pressure-responsive members embodying a vertically disposed cylinder 27 which is open at its lower end and which has a piston 28 slidably mounted therein for relative vertical reciprocation. The upper end of the cylinder 27 is threaded into a head 29. This head 29 is provided with an inlet 30 which is adapted to supply fluid, for example, air under a predetermined constant pressure, to the upper end of the cylinder. Extending slidably through the head 29 is a vertically disposed piston rod 31. The lower end of this rod 31 is anchored firmly in fixed axial position to the piston 28 and its upper end is fixed axially, as indicated at 32, in the outer end of a rigid bracket 33. This bracket 33 has a pivot pin portion 34, the axis of which is parallel with the axis of the spindle shaft 17 and which is rotatably mounted in a pivot bearing 35 at the outer end of a first bellcrank 36. The inner end of the crank 36 is keyed on the outer end of the shaft 17. Adjacent the crank, the shaft 17 also carries a gear 37 which is keyed thereto. This gear 37 meshes with and drives an identical gear 38. This gear 38 is keyed on the outer end of a shaft 39 which is rotatably carried by a bearing structure 40 mounted on the headstock 11 at a position spaced below the bearing 18. The shaft 39 is parallel to the shaft 17 and is disposed in the same vertical plane. The outer end of this shaft 39 has a second bellcrank 40' keyed thereon and this crank has the same throw as the first bellcrank 36. The outer end of this crank 40' is provided with a bearing 41 which is axially parallel with the shaft 39 and which rotatably receives a trunnion 42 formed on the cylinder head 29.

It will be apparent best from Figure 4 that the axis of the spindle shaft 17 and the axis of the shaft 39 are spaced vertically from each other and are in the same vertical plane. It will also be apparent that the cranks 36 and 40' have the same throw with the pivot axes 34 and 42 thereof being the same radial distance from the respective shaft axes 17 and 39. Furthermore, the cranks 36 and 40' are geared together for simultaneous rotation by means of the meshing gears 37 and 38 which will rotate in opposite directions towards each other, as indicated by the arrows in Figure 4. Consequently, the pivots 34 and 42 will always be in the same vertical plane and, therefore, the cylinder 42 will always be upright and the axis of the cylinder 27 and piston 28 will always be vertical. However, during rotation of the gears, the pivots 34 and 42 will gradually approach and recede relative to each other to produce relative reciprocation of the piston 28 and the cylinder 27.

The cylinder and piston unit 26 at the opposite end of the machine is identical with that just described and is mounted in an identical manner. The cylinder 45 thereof is provided with the piston rod 46 which is connected to the crank 47. This crank is keyed on the spindle shaft 19 in association with the gear 48 which is also keyed thereon. This gear 48 meshes with an identical gear 49 which is keyed on a shaft 50 along with the crank 51, the shaft 50 being carried by the tailstock 12. This crank 51 is connected to the head 52 provided on the cylinder 45.

The spindle shaft 17 may be positively driven by a suitable drive 53 and the spindle shaft 19 will be simultaneously driven through the crankshaft C which is carried by the chucks 14 and 15 associated with the respective spindle shafts.

As indicated diagrammatically in Figure 5, the cylinders 27 and 45 have their inlets connected together by a line 55 leading from a large accumulator 56. Pressure in the accumulator 56, the line 55 and the cylinders 27 and 45 is supplied by way of a pressure-supply line 57 leading from a pump 58 and controlled by a regulating valve 59. The volume of the accumulator 56 is so selected relative to the volume of the cylinders 27 and 45 that pressure differentials caused by reciprocation of the pistons within the cylinders is negligible and, therefore, for all practical purposes the pressure acting upon the pistons at any given position is substantially constant. It will be understood, however, that the constant pressure within the system may be adjusted in magnitude by manual operation of the valve 59.

It is desirable to provide a pneumatic counterbalance unit in association with each end of the crankshaft, as indicated, to prevent twist of the shaft but if the machine is designed to grind short shafts, a counterbalance at one end only of the crankshaft may be used. In describing the operation of the counterbalance system of this invention, only one unit will be referred to in detail but it will be readily understood that both units will operate in the same manner. The operation of each counterbalance unit is indicated diagrammatically in Figures 6 to 9 which show the unit 25.

The throws or lengths of the first and second bellcranks 36 and 40' are equal and may be of any reasonable length dependent upon available space on the machine. The pressure necessary to balance a particular size and model crankshaft may be determined by test and the regulating valve 59 may be adjusted to provide air pressure of predetermined amount. A given constant pressure supplied above the piston 28 is so selected with reference to the effective area of the piston and the bellcrank moment arm, extending from the axis 17 to the axis of the pivot 34, that the counterbalancing effect exerted through the piston rod 31 will exactly counterbalance the unbalanced weight of the crankshaft.

The torque exerted by an off-center or unbalanced weight of a body rotated about a normally fixed horizontal axis will depend upon the horizontal distance from the weight to a vertical line passing through the rotational axis of the weight. This is the moment arm of the unbalanced weight which gradually increases and decreases during rotation of the body. The torque exerted by the unbalanced weight will increase as the unbalanced weight moves from the zenith downwardly through an arc of 90 degrees. The torque will thereafter decrease as the unbalanced weight moves to the nadir of the circle.

Figure 6:
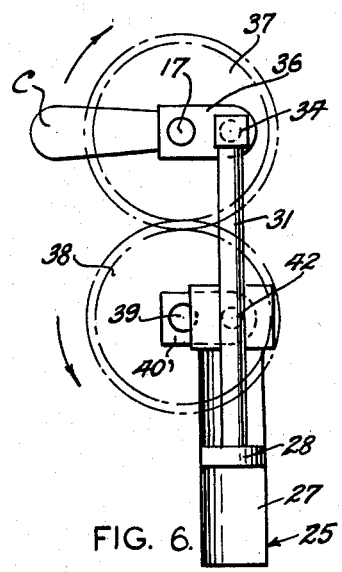
Figure 7:
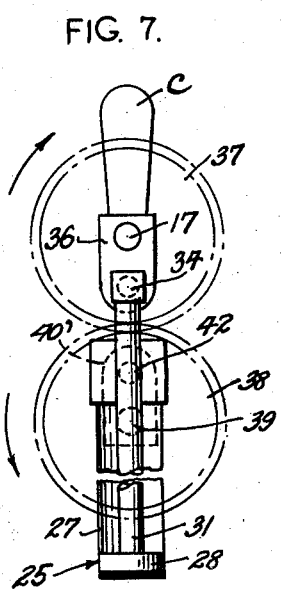
Figure 8:
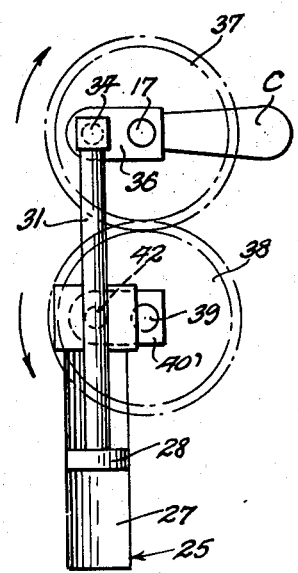
Figure 9:
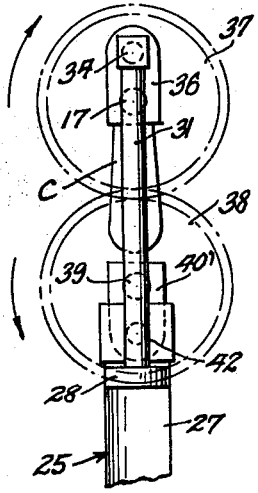

As shown in Figure 6, the throw of the crankshaft with the unbalanced weight is indicated at C and this will be referred to as the unbalanced weight. The throw of the bellcrank 36 is arranged diametrically opposite the throw of the unbalanced weight C. As the unbalanced weight C is rotated clockwise about the axis 17 along with the bellcrank 36, the piston 28 moves relatively toward the lower end of the cylinder 27, as indicated in Figure 7. Since the pivot points 34 and 42 move toward each other, due to the fact that the gear 38 is driven by the gear 37, the second bellcrank 40' moves in the opposite direction and to the same angular extent as the first bellcrank 36. The constant air pressure on the piston 28 will balance the weight C regardless of its angular position since as the effective moment arm of the bellcrank 36 shortens or lengthens, that of the weight C changes correspondingly. As the bellcranks 36 and 40' swing in opposite directions from the position shown in Figure 7 to the position shown in Figure 8, the piston 28 moves relatively toward the upper end of the cylinder 27 due to the further separation of the pivots 34 and 42, but the air pressure in the upper end of the cylinder remains substantially constant so as to continue to balance the weight C. During opposite swinging of the bellcranks 36 and 40', to the position shown in Figure 9, the effective moment arms of the bellcrank 36 and the weight C changes correspondingly and although the piston 28 continues to move into the upper end of the cylinder 27, the air pressure therein remains substantially constant so that the constant pressure along with the changing moment arm of the bellcrank exactly balances the fixed weight C with its correspondingly changing moment arm. The vector of the counterbalance force applied by the cylinder and piston unit is always vertical since the piston rod pivot 34 and the cylinder pivot 42 are always in the same vertical plane, which causes the moment arm of the unbalanced weight and the moment arm of the counterbalance torque force to be maintained in direct proportion at all times during rotation of the weight C.

Thus, according to this invention, the pressure to balance the unbalanced weight at any angle of rotation thereof is dependent on three constants, namely, the amount of the unbalanced weight, the throw of the weight, and the balancing bellcrank lever length. The theoretical constant air pressure to balance is independent of the angular displacement of the unbalanced weight and is directly proportional to the amount and throw of the unbalanced weight and the length of the torque-applying bellcrank lever and can, therefore, theoretically exactly balance any unbalanced weight at any angular position during its rotation, assuming the accumulator is sufficiently large to maintain the air pressure in the cylinder substantially constant during relative reciprocation of the cylinder and piston. Thus, according to this system, any crankshaft can be balanced merely by adjusting the regulator valve to provide a selected constant air pressure on the piston.

It will be apparent that according to this invention the pneumatic balancing system includes a pneumatic unit having relatively movable pressure-responsive members, the one member being pivotally connected to the unbalanced weight radially of its horizontal axis of rotation by a first bellcrank and the other member being pivotally connected to a body driven with the unbalanced weight about a horizontal axis spaced vertically from the first horizontal axis and in the same vertical plane by a second bellcrank, each of the pivot connections being at the same distance from the associated horizontal axis of rotation, the unbalanced weight and driven body being rotated in opposite directions to move the pivot connections towards and away from each other but being maintained in the same vertical plane, and means for maintaining a substantially constant pressure in said pneumatic unit.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In combination with a machine tool having a tool and means for mounting a body for rotation about a normally fixed horizontal axis where it is unbalanced and is in cooperative relationship with said tool and for driving it about said axis, a pneumatic balancing unit including relatively movable pressure-responsive members, means for maintaining a substantially constant pressure in said unit, means for pivotally connecting one of said pressure-responsive members to said mounting and driving means radially of said horizontal axis so that the pressure in said unit acts to counterbalance the unbalanced body when mounted and rotated thereon, a second body, means for mounting said second body for rotation about a second normally fixed horizontal axis spaced from the first horizontal axis in the same vertical plane and for driving it about said second axis, means for pivotally connecting the other of said pressure-responsive members to said second body radially of said second horizontal axis of rotation, each of the pivot connections being at the same distance from the associated horizontal axis of rotation, and said mounting and driving means for the two bodies rotating in opposite directions so that the pivot connections will move toward and from each other in the same vertical plane.

2. In combination with a machine tool having a tool and means for mounting a body for rotation about a normally fixed horizontal axis where it is unbalanced and is in cooperative relationship with said tool and for driving it about said axis, a pneumatic balancing unit including relatively movable piston and cylinder members disposed with their axes in upright vertical position, means for maintaining a substantially constant pressure of air in one end of the cylinder member to act on the piston member, means for pivotally connecting one of said members to said mounting and driving means radially of said horizontal axis so that the air pressure on the piston acts to counterbalance the unbalanced body when mounted and rotated thereon, a second body, means for mounting said second body for rotation about a second normally fixed horizontal axis spaced from the first horizontal axis in the same vertical plane and for driving it about said second axis, means for pivotally connecting the other of said members to said second body radially of its horizontal axis of rotation, each of the pivot connections being at the same distance from the associated horizontal axis of rotation, and said mounting and driving means for the two bodies rotating in opposite directions so that the pivot connections will move toward and from each other in the same vertical plane with the cylinder and piston members remaining upright.

3. The combination of claim 2 in which said means for maintaining the constant pressure of air in the cylinder member comprises an accumulator tank connected to the cylinder member and a source of air supply to said accumulator tank for maintaining it substantially at a predetermined pressure.

4. The combination of claim 3 in which said source of air supply is a pump connected to the accumulator and the cylinder member, and a regulator valve between the pump and its connections to the accumulator and cylinder member.

5. The combination of claim 2 in which said second body is a gear, and said first mounting and driving means for the unbalanced body includes a second identical gear, said gears being in mesh with each other.

6. In combination with a crankshaft grinding machine comprising a grinding unit, means for mounting a crankshaft body for rotation about a horizontal axis where it is unbalanced and is in cooperative relationship with said grinding unit and for driving it about said axis, a pneumatic balancing unit including relatively movable pressure-responsive members, means for maintaining a substantially constant pressure in said unit, means for pivotally connecting one of said pressure-responsive members to said mounting and driving means radially of said horizontal axis so that the pressure in said unit acts to counterbalance the unbalanced crankshaft body when mounted and rotated thereon, a second body, means for mounting said second body for rotation about a second horizontal axis spaced from the first horizontal axis in the same vertical plane and for driving it about said second axis, means for pivotally connecting the other of said pressure-responsive members to said second body radially of said second horizontal axis of rotation, each of the pivot connections being at the same distance from the associated horizontal axis of rotation, and said mounting and driving means for the two bodies rotating in opposite directions so that the pivot connections will move toward and away from each other in the same vertical plane.

7. The combination of claim 6 in which the relatively movable pressure-responsive members embody a cylinder and piston, said pressure maintaining means being connected to one end of said cylinder to act on the piston therein.

8. The combination of claim 7 in which said means comprises a relatively large accumulator connected to the cylinder, and means for maintaining a predetermined pressure in the accumulator.

9. The combination of claim 8 including a regulating valve connected to the accumulator for selectively setting the pressure.

10. The combination of claim 9 in which said first mounting and driving means comprises means for mounting the unbalanced crankshaft body on spindle supports, said first pivotally connecting means comprising a first gear driven by one of the spindles, and said second body comprising a second identical gear driven by the first gear.

11. In combination with a machine having a tool for working on a workpiece and means for supporting the workpiece in cooperative relationship with said tool for rotation about a normally fixed axis where it is out of balance and for driving it about said axis, a pneumatic balancing unit for applying a pneumatic counterbalancing force to the workpiece when mounted and rotated on said means and comprising relatively reciprocable piston and cylinder members, means for maintaining substantially constant pressure in one end of said cylinder, one of said members being connected to said mounting and driving means by a bellcrank arm which opposes the throw of the unbalanced weight in the workpiece when mounted thereon and swings about said first axis, said arm being pivoted to the member at the axis of said unit, a second bellcrank arm driven at the same angular speed as the first bellcrank arm but in an opposite direction about a selected radially fixed axis in the same plane as said first axis, said second bellcrank being pivotally connected to the other of said members at the axis of said unit, the pivotal connections of the two bellcrank arms to the pneumatic unit being in the same plane.

12. In combination with a machine having a tool for working on a workpiece and means for supporting the workpiece in cooperative relationship with said tool for rotation about a normally fixed axis where it is out of balance and for driving it about said axis, a bellcrank arm for applying a torque balance force to said means and connected thereto for swinging movement about said axis, a second bellcrank arm mounted for swinging movement in an opposite direction but at the same angular speed about a second normally fixed axis, said first and second axis being in the same plane but spaced radially from each other, and a pneumatic balancing unit pivotally connected between said first and second bellcrank levers at pivot points spaced radially from the axis of swing of said bellcrank levers and which are in the same plane so that a line passing through said pivot points of the arms will be parallel to a line passing through said axes of swing of the bellcrank arms at all times during rotation of said workpiece.

References Cited in the file of this patent

UNITED STATES PATENTS

| | | |
|---|---|---|
| 2,737,761 | Berry et al. | Mar. 13, 1956 |
| 2,737,762 | Berry et al. | Mar. 13, 1956 |